3,373,156
SUBSTITUTED 6-AMINOPENICILLANIC
ACIDS AND SALTS
Peter Bamberg, Bertil Åke Ekström, and Berndt Olof Harald Sjöberg, Sodertalje, Sweden, assignors to Aktiebolaget Astra, Sodertalje, Sweden, a company of Sweden
No Drawing. Filed Aug. 29, 1966, Ser. No. 575,533
Claims priority, application Sweden, Aug. 30, 1965, 11,313/65
13 Claims. (Cl. 260—239.1)

The present invention relates to antibiotic compounds and their preparation. In particular it concerns penicillins containing a substituted N-2-sulfonylethoxycarbonyl-amino radical in the side chain.

The compounds prepared according to the present invention are of value as antibiotics, as nutritional supplement in animal feeds, as agents for treatment of mastitis in cattle, and as therapeutic agents in the treatment of infectious diseases in humans, animals and poultry.

It is an object of the present invention to obtain penicillins containing a substituted N-2-sulfonylethoxycarbonylamino group in the side chain, and to provide a method for their production.

The present invention provides compounds of the general formula:

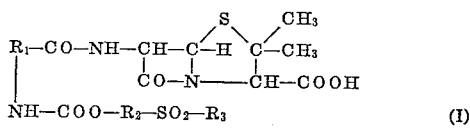

(I)

in which $R_1$ is an alkylene group of not more than 5 methylene radicals. One or more of the hydrogens on the $R_1$ methylene radicals may be substituted by an aliphatic radical, a cycloaliphatic radical, an araliphatic radical, an aromatic radical, or a heterocyclic radical of not more than 10 carbon atoms. All of the foregoing groups can be unsubstituted or substituted by one or more halogen atoms, lower alkyl groups, lower alkoxy groups, aryloxy groups, lower acyloxy groups, carbethoxy groups, lower acylamido groups, lower alkylmercapto groups, nitro groups, amino groups, substituted amino groups, or lower alkyl-or arylsubstituted sulfoxy groups;

$R_2$ is an unsubstituted ethylene radical;

$R_3$ is an aryl radical containing not more than 10 carbon atoms, which may be unsubstituted or substituted by one or more halogen atoms, lower alkyl radicals, lower alkoxy radicals, aryloxy radicals or nitro radicals;

$R_1$ and $R_3$ are illustrated by the following compounds:

N - (2 - p - tolylsulphonylethoxycarbonyl)amino-methylpenicillin, 6 - [D - α - (2 - p - tolylsulphonyl-ethoxycarbonylamino)phenylacetamido] penicillanic acid, α - (2 - p - tolylsulphonylethoxycarbonylamino) - 2,4-dichlorobenzylpenicillin, α - (2 - p - tolylsulphonylethoxycarbonylamino) - m - fluorobenzyl - penicillin, α - (2 - p-tolylsulphonylethoxycarbonylamino) - p - methylbenzylpenicillin, α - (2 - p - tolylsulphonylethoxycarbonylamino) - p - dimethylaminobenzylpenicillin, α - (2 - p - tolylsulphonylethoxycarbonylamino) - o - methoxybenzylpenicillin, α - (2 - p - tolylsulphonylethoxycarbonylamino) - p - phenoxybenzylpenicillin, α - (2 - p - tolylsulphonylethoxycarbonylamino) - β - acetoxyethylpenicillin, α - (2 - p - tolylsulphonylethoxicarbonylamino)-γ-carbethoxypropylpenicillin, α - (2 - p - tolylsulphonylethoxycarbonylamino) - γ - methylsulpoxypropylpenicillin, β - (2 - phenylsulphonylethoxycarbonylamino) - α - 2-tienylethylpenicillin, α - (2 - phenylsulphonylethoxycarbonylamino) - cyclohexylmethylpenicillin, γ - (2 - p - chlorophenylsulphonylethoxycarbonylamino) - α - phenylpropylpenicillin, α - (2 - p - chlorophenylsulphonylethoxycarbonylamino) - 2 - furylmethylpenicillin, α - (2 - p - ethoxyphenylsulphonylethoxycarbonylamino) - γ - methylbutylpenicillin, α - (2 - p - nitrophenylsulphonylethoxycarbonylamino)-β-phenylethylpenicillin.

The invention also comprises non-toxic salts of Formula I compounds. The salts include non-toxic metallic salts, such as sodium in case of α-(2-p-tolylsulphonyl-ethoxycarbonylamino) - m - fluorobenzylpenicillin, potassium, as in case of 6-[D-α-2-p-tolylsulphonylethoxycarbonylamino)-phenylacetamido]penicillanic acid, calcium, as in case of α-(2-p-tolylsulphonylethoxycarbonylamino)-2,4-dichlorobenzylpenicillin, aluminum, as in case of α-(2-p-tolylsulphonylethoxycarbonylamino) - o - methoxybenzylpenicillin, and non-toxic ammonium and substituted ammonium salts, such as the trialkylamines, including triethylamine, as in case of α-(2-p-tolylsulphonyl-ethoxycarbonylamino)-ethylpenicillin, procaine, as in case of α - (2 - p - chlorophenylsulphonylethoxycarbonylamino)-β-methylpropylpenicillin, dibenzylamine, as in case of α - (2 - p-tolylsulphonylethoxycarbonylamino)-β-acetoxypropylpenicillin, N-benzylphenethylamine, as in case of α-(2-p-tolylsulphonylethoxycarbonylamino)propylpenicillin, 1-ephenamine, as in case of α-(2-p-chlorophenylsulphonylethoxycarbonylamino)cyclopentylmethylpenicillin, N,N'-dibenzylethylenediamine, as in case of α-(2 - p - nitrophenylsulphonylethoxycarbonylamino) - m-chlorobenzylpenicillin, dehydroabiethylamine, as in case of α - (2 - phenylsulphonylethoxycarbonylamino)-benzylpenicillin, N,N'-bisdehydroabiethylenediamine, as in case of β-(2-p-tolylsulphonylethoxycarbonylamino)-α-phenylethylpenicillin and other amines, which have been used to form salts with benzylpenicillin or phenoxymethylpenicillin.

The present invention further provides a method for preparing Formula I compounds, which comprises reacting a compound of the general formula:

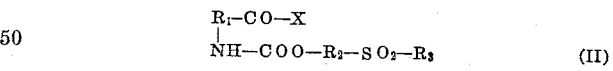

(II)

or $$R_3-SO_2-R_2-OCO-Cl$$

with a compound of the general formula:

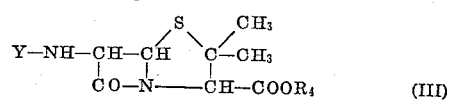

(III)

and

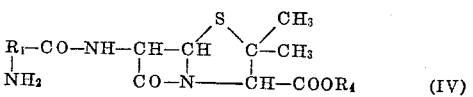

(IV)

respectively, where $R_1$, $R_2$ and $R_3$ have the same meaning as above. $R_4$ is a hydrogen, a cation, or a di- or trialkylsilyl group, such as a dimethylsilyl or a trimethylsilyl group, —CO—X and Y—NH— are groups of atoms capable of reacting with each other with the formation of a carbon-nitrogen bond so that eventually upon hydrolysis, a —CO—NH— group is obtained. Y is preferably a hydrogen atom or a di- or trialkylsilyl group, such as α dimethylsilyl or α trimethylsilyl group.

The compound of general Formula II is an acid chloride or its functional equivalent such as an acid bromide, an activated ester, an anhydride, a mixed anhydride, especially one formed with an alkoxy formic acid, or a derivative obtained by reaction between a carboxylic acid and a carbodiimide or other compounds functioning in the same way, such as N,N'-carbonyldiimidazole or N-ethyl-5-phenylisoxazolium-3'-sulphonate. Formula II compounds are illustrated by (2-p-tolylsulphonylethoxy-carbonylamino)-acetyl chloride, ethoxyformic anhydride of α - (2 - p - tolylsulphonylethoxycarbonylamino) - phenylacetic acid, 2-p-tolylsulphonylethoxycarbonyl chloride, 2-p-chlorophenylsulphonylethoxycarbonyl chloride.

The compounds of the general Formulas III and IV respectively are 6-aminopenicillanic acid and an aminopenicillin, or salts of them with inorganic bases or organic tertiary bases, such as the sodium salt of 6-aminopenicillanic acid and the triethylamine salt of α-aminobenzylpenicillin, in which cases the acylation reaction can be performed, eventually with addition of base, in water or in mixtures of water and organic solvent such as acetone, methylisobutylketone, ether, tetrahydrofurane, dimethylformamide, N,N-dimethylacetamide, methylene chloride, chloroform, ethylacetate, butylacetate, benzene or toluene; or the acylation reaction can be performed in dry organic solvents such as methylene chloride or chloroform. Alternatively, the compound of the general Formula III is a N-trialkylsilylaminopenicillanic acid, trialkylsilylester or a reaction product obtained by treatment of 6-aminopenicillanic acid with silylating reagents such as N-trimethylsilyl-diethylamine or dimethyldichlorosilane, capable of transferring di- or trialkylsilyl groups to the acid. In these cases the acylation reaction is performed, preferably in the presence of organic tertiary bases, in dry homogeneous solutions of organic solvents such as ether, tetrahydrofurane, dioxane, dimethylformamide, N, N-dimethylacetamide, methylene chloride, chloroform, carbon tetrachloride, ethylacetate, benzene or toluene.

If the Formula II compounds contain one or more asymmetric centers the resulting Formula I compounds may exist in different diastereoisomeric forms, which are all antibacterially active.

It is understood that the present invention comprises the diastereoisomers as well as mixtures of them.

In this specification and the claims the term "lower" designates at most 6 carbon atoms.

The following examples illustrate the invention, but in no way limit it:

*Example 1.—Preparation of N-2-p-tolylsulphenylethoxy-carbonylaminomethylpenicillin*

6-aminopenicillanic acid (2.2 g., 0.01 mole) and triethylamine (3 g., 0.03 mole) in 100 ml. of dry methylene chloride were stirred for 2 hours in an ice-bath. N-2-p-tolylsulphenylethoxycarbonylglycyl chloride (3.2 g., 0.01 mole) was added to the obtained light suspension and stirring and cooling was continued for 2 hours. Water (100 ml.) was added and the mixture was acidified to pH 2. After separation of the phase the organic layer was treated once more with 100 ml. of water at pH 2 and was then washed twice with water. The organic solution, containing the free penicillin, was extracted with N potassium bicarbonate solution till the aqueous phase was neutral. Freeze-drying of the latter gave 2.6 g. of the potassium salt of N-2-p-tolylsulphonylethoxycarbonyl-aminomethylpenicillin with a purity of 88% (hydroxylamine assay with 6-aminopenicillanic acid as standard).

The product was found to inhibit the growth of *Staph. aureus,* Oxford at a concentration of 0.25 mcq./ml.

The N-2-p-tolylsulphenylethoxycarbonylglycy chloride was prepared according to A. T. Kader and C. J. M. Stirling (J. Chem. Soc. 1962, 258).

*Example 2.—Preparation of α-(2-p-tolylsulphenylethoxy-carbonylamino)-heptylpenicillin*

α-(2 - p - tolylsulphonylethoxycarbonylamino)-caprylic acid (6.7 g., 0.017 mole) and triethylamine (1.76 g., 0.017 mole) in 80 ml. of dimethylformamide was treated at —10° C. dropwise with ethyl chloroformate (1.9 g., 0.017 mole), while stirring. 10 min. after that all the chloroformate had been added an ice-cooled solution of 6-aminopenicillanic acid (5.6 g., 0.026 mole) and triethylamine (2.9 g., 0.029 mole) was rapidly added. Stirring was continued for 90 min. without external cooling. Water was added and the mixture was washed with ether, acidified to pH 2 and extracted twice with ether. The combined ether extracts were washed with water and then extracted with N potassium bicarbonate solution till the aqueous phase was neutral. Freeze-drying of the latter gave 7.6 g., of the potassium salt of α-(N-2-p-tolylsulphonylethoxycarbonylamino)heptylpenicillin with a purity of 92% (hydroxylamine assay with the potassium salt of benzylpenicillin as standard).

The product was found to inhibit the growth of *Staph. aureus* Oxford at a concentration of 0.25 mcq./ml.

The starting material was prepared by treatment of α-aminocaprylic acid methyl ester in chloroform with 2-p-tolylsulphenylethyl chloroformate in presence of triethylamine. The obtained product was hydrolyzed by treating with acetic acid containing concentrated hydrochloric acid to give α-(2-p-tolylsulphenylethoxycarbonylamino)-caprylic acid. For analysis it was converted into its cyclohexylamine salt, M.P. 117–120° C. (Found: C, 58.71; H, 8.13; N, 5.57%. Calculated for $C_{24}H_{40}N_2O_6S$: C, 59.48; H, 8.32; N, 5.78%.)

*Example 3.—Preparation of 6-[D-α-(2-p-tolylsulphonyl-ethoxycarbonylamino) - phenylacetamido] penicillanic acid*

D-α-(2-p - tolylsulphonylethoxycarbonylamino)phenyl-acetic acid (3 g., 0.008 mole) was dissolved together with triethylamine (0.81 g., 0.008 mole) in 50 ml. of dimethylformamide. Ethylchloroformate (0.87 g., 0.008 mole) was added dropwise with stirring at —10° C. 10 min. after that all of the chloroformate had been added an ice-cooled solution of 6-aminopenicillanic acid (2.6 g., 0.012 mole) and triethylamine (1.4 g., 0.014 mole) in 30 ml. of water was rapidly added and stirring was continued for 90 min. without external cooling. Water was added and the mixture was washed with ether, acidified to pH 2 and extracted twice with ether. The combined ether extracts were washed with water and extracted with N potassium bicarbonate till the aqueous phase was neutral. Freeze-drying of the latter gave 3.1 g. of the potassium salt of 6-[D-α-(2-p-tolylsulphonylethoxycarbonylamino) - phenylacetamido] penicillanic acid with a purity of 75% (hydroxylamine assay with the potassium salt of benzylpenicillin as standard).

The product was found to inhibit the growth of *Staph. aureus* Oxford at a concentration of 0.25 mcg./ml.

D-(α - 2-p-tolylsulphonylethoxycarbonylamino)phenyl-acetic acid was prepared by treatment of D-α-aminophenylacetic acid in water at pH 9 with 2-p-tolylsulphonylethoxycarbonyl chloride. The product was isolated by extraction with ether at pH 2. For analysis it was converted into its cyclohexylamine salt, M.P. 162–163° C. (Found: C, 60.7; H, 6.65; N, 6.17; S, 6.18%. Calculated for $C_{24}H_{32}N_2O_6S$: C, 60.48; H, 6.77; N, 5.88; S, 6.73%.)

In the manner, described in Examples 2 and 3, the following N-2 - p - tolylsulphonylethoxycarbonylamino-penicillins were prepared. In the table are given: yields and purities (hydroxylamine assay) of the products together with their activities against Staph. aureus Oxford. (M.I.C.=minimum inhibitory concentration in mcg./ml., determined in serial dilution tests on agar plates. [TSEC means 2-p-tolylsulphonylethoxycarbonyl.])

| Penicillin | Yield (Percent) | Purity (Percent) | M.I.C. (mcg./ml.) |
|---|---|---|---|
| α-TSEC-aminopropylpenicillin | 22 | 89 | |
| α-TSEC-aminobutylpenicillin | 48 | 73 | 0.25 |
| α-TSEC-aminopentylpenicillin | 60 | 64 | 0.25 |
| α-TSEC-amino-γ-methyl-butylpenicillin | 46 | 80 | 0.63 |
| α-TSEC-amino-β-methyl-butylpenicillin | 34 | 56 | 0.63 |
| α-TSEC-amino-γ-thiomethyl-propylpenicillin | 47 | 68 | 0.13 |
| 6-(L-α-TSEC-amino-β-methyl-butyramido) penicillianic acid | 45 | 68 | |
| 6-[L-α-TSEC-amino-(L)-β-methyl-valeramido] penicillanic acid | 57 | 66 | 1.25 |
| 6-(L-α-TSEC-amino-γ-thio-methyl-butyramido) penicillanic acid | 22 | 66 | |
| 6-(D-α-TSEC-amino-γ-thio-methyl-butyramido) penicillanic acid | 47 | 85 | 0.63 |
| δTSEC-aminobutylpenicillin | 9 | 38 | 0.63 |

The N-2 - p-tolylsulphonylethoxycarbonylamino acids used as starting material for the penicillins, mentioned above, were prepared by treatment of the aminoacids in aqueous solutions at pH 9 with 2-p-tolylsulphonylethoxycarbonyl chloride as described in Example 3. Alternatively they were prepared via their esters as described in Example 2. Usually cyclohexylamine or dicyclohexylamine salts of the acids were prepared for analysis. The following physical were recorded data:

The D-α-(2 - phenylsulphonylethoxycarbonylamino)-phenylacetic acid was obtained by treatment of D-α-aminophenylacetic acid in aqueous solution at pH 9 with 2-phenylsulphonylethoxycarbonyl chloride. The product was isolated by extraction with ether at pH 2, and was crystallized from ethylacetate-ligroin, M.P. 159–161° C. (Found: C, 56.80; H, 4.79; N, 3.64; S, 8.81. Calc. for $C_{17}H_{17}NO_6S$: C, 56.18; H, 4.72; N, 3.86; S, 8.82.)

*Example 5.—Preparation of 6-[α-(2-p-tolylsulphonylethoxycarbonylamino)-β-methyl-β-(p-methoxyphenyl)butyramido] pencillanic acid*

α - (2 - p - tolylsulphonylethoxycarbonylamino) - β-methyl-β-(p-methoxyphenyl)butyric acid (2.1 g. 0.0045 mole) and triethylamine (0.45 g., 0.0045 mole) were stirred in 25 ml. of dry dimethylformamide and treated dropwise at —10° C. with isobutyl chloroformate (0.61 g., 0.0045 mole). 10 min. after that all of the chloroformate had been added a solution, in 10 ml. of dry dimethylformamide, of a trimethylsilyl-derivate of 6-aminopenicillanic acid (prepared as described in British Patent No. 959,853, Example 8, from 1.5 g. (0.0063 mole) of 6-aminopenicillanic acid) and N-trimethylsilylamine, was added and stirring was continued for 90 min. without external cooling. The reaction mixture was poured into water, washed with ether, acidified and extracted twice with ether. The combined ether extracts were washed with water and extracted witd N potassium bicarbonate till the aqueous phase was neutral. Freeze-drying of the latter

| N-2-p-tolylsulphonyl-ethoxycarbonyl compound of— | | M.P. (° C.) | | Elemental analysis (percent) | | | |
|---|---|---|---|---|---|---|---|
| | | | | C | H | N | S |
| α-Aminobutyric acid [1] | | 128–130 | Found | 56.94 | 7.97 | 6.52 | |
| | | | Calc | 57.87 | 7.95 | 6.14 | |
| Norvaline [1] | $C_{21}H_{34}N_2O_6S$ | 118–120 | Found | 56.80 | 7.78 | 6.29 | |
| | | | Calc | 56.99 | 7.74 | 6.33 | |
| L-valine | $C_{15}H_{21}NO_6S$ | 108–113 | Found | 52.2 | 6.10 | 4.00 | 9.40 |
| | | | Calc | 52.46 | 6.16 | 4.08 | 9.34 |
| Norleucine [1] | $C_{22}H_{36}N_2O_6S$ | 122–128 | Found | 56.88 | 7.81 | 6.51 | |
| | | | Calc | 57.87 | 7.95 | 6.14 | |
| L-isoleucine | $C_{22}H_{36}N_2O_6S$ | 150–152 | Found | 57.7 | 7.84 | 6.15 | 7.07 |
| | | | Calc | 57.87 | 7.95 | 6.14 | 7.02 |
| Leucine [1] | $C_{22}H_{36}N_2O_6S$ | 142–145 | Found | 57.00 | 7.88 | 6.27 | |
| | | | Calc | 57.87 | 7.95 | 6.14 | |
| Alloisoleucine [1] | $C_{22}N_{36}N_2O_6S$ | 128–130 | Found | 56.94 | 7.97 | 6.52 | |
| | | | Calc | 57.87 | 7.95 | 6.14 | |
| L-methionine [1] | $C_{21}H_{34}N_2O_6S_2$ | 129–132 | Found | 51.9 | 7.20 | 6.11 | |
| | | | Calc | 53.14 | 7.22 | 5.90 | |
| Methionine [2] | $C_{27}H_{44}N_2O_6S_2$ | 141–144 | Found | 57.5 | 7.75 | 5.31 | 11.6 |
| | | | Calc | 58.2 | 7.97 | 5.03 | 11.52 |
| D-methionine [1] | $C_{21}H_{34}N_2O_6S_2$ | 124–126 | Found | 52.31 | 7.18 | 5.96 | 13.81 |
| | | | Calc | 53.14 | 7.22 | 5.90 | 13.51 |
| δ-Aminovaleric acid | $C_{15}H_{21}NO_6S$ | 70–79 | Found | 52.33 | 6.27 | 3.96 | 9.50 |
| | | | Calc | 52.46 | 6.16 | 4.08 | 9.34 |

[1] Cyclohexylamine salt. [2] Dicyclohexylamine salt.

*Example 4.—Preparation of 6-[D-α-(2-phenylsulphonyl-ethoxycarbonyl-amino)-phenylacetamido] - penicillanic acid*

D-α-(2 - phenylsulphonylethoxycarbonylamino)phenylacetic acid (1.75 g., 0.0048 mole) was dissolved together with triethylamine (0.49 g., 0.0048 mole) in 25 ml. of dry dimethylformamide. Ethyl chloroformate (0.52 g., 0.0048 mole) was added dropwise with stirring at —10° C. 10 min. after that all of the chloroformate had been added a chilled solution of 6-aminopenicillanic acid (1.6 g., 0.0072 mole) and triethylamine (0.78 g., 0.0077 mole) was rapidly added and stirring was continued for 90 min. without external cooling. Water was added and the reaction mixture was washed with ether, acidified to pH 2 and extracted twice with ether. The combined ether layers were washed with water and extracted with potassium bicarbonate solution till the aqueous phase was neutral. Freeze-drying of it gave 1.9 g. of the potassium salt of 6-[D - α - (2 - phenylsulphonylethoxycarbonylamino)-phenylacetamido] pencillanic acid with a purity of 92% (hydroxylamine assay).

The product was found to inhibit the growth of Staph. aureus Oxford at a concentration of 0.13 mcg./ml.

gave 0.8 g. of the potassium salt of 6-[α-(2-p-tolylsulphonylethoxycarbonylamino) - β - methyl - β - (p-methoxyphenyl)butyramido] penicillanic acid with a purity of 95% (hydroxylamine assay with the potassium salt of benzylpenicillin as standard).

This product was found to inhibit the growth of Staph. aureus Oxford at a concentration of 0.63 mcg./ml.

α - (2 - p - tolylsulphonylethoxycarbonylamino) - β-methyl-β-(p-methoxyphenyl)butyric acid, M.P. 138–140° C., was obtained by treatment of β,β-dimethyl-p-methoxyphenylalanine with 2-p-tolylsulphonylethoxycarbonyl chloride at pH 9 in 50% dioxane. It was isolated by extraction with ether after acidification of the reaction mixture.

*Example 6.—Preparation of 6-[β-(2-p-tolylsulphonylethoxycarbonylamino)-α-phenylpropionamido]penicillanic acid*

To a stirred and cooled solution of β-amino-α-phenylpropionic acid (3.3 g., 0.02 mole) in 50% dioxane at pH 9, 2-p-tolylsulphonylethoxycarbonyl chloride (5.8 g., 0.0022 mole), dissolved in 10 ml. of benzene, was added dropwise while keeping the pH constant by addition of 2 N sodium hydroxide. After the consumption of alkali had stopped, the reaction mixture was washed with ether, acidified and repeatedly extracted with ether. The combined ether extracts were washed with water, dried and evaporated to give β-(2-p-tolylsulphonylethoxycarbonylamino)-α-phenyl propionic acid (6.3 g.) as a slightly coloured oil. This was dissolved together with triethylamine (1.7 g., 0.017 mole) in 100 ml. of dry dimethylformamide and treated dropwise with ethyl chloroformate (1.85 g., 0.017 mole), while stirring at −10° C. 10 min. after that all of the chloroformate had been added an ice-cooled solution of 6-aminopenicillanic acid (4.3 g., 0.02 mole) and triethylamine (2.2 g., 0.022 mole) in 50 ml. of water was added and stirring was continued for 90 min. without external cooling. Water was added and the reaction mixture was washed with ether, acidified to pH 2 and extracted twice with ether. The combined ether extracts were washed with water and extracted with a N potassium bicarbonate solution till the aqueous phase was neutral. Freeze-drying of the latter gave 6.2 g. of the potassium salt of 6-[β-(2-p-tolylsulphonylethoxycarbonylamino) - α - phenylpropionamido]penicillanic acid with a purity of 61% (hydroxylamine assay with the potassium salt of benzylpenicillin as standard).

The product was found to inhibit the growth of *Staph. aureus* Oxford at a concentration of 0.25 mcg./ml.

minimum inhibitory concentartion in mcg./ml., determined in serial dilution tests on agar plates). TSEC means 2-p-tolylsulphonylethoxycarbonyl.

| Penicillin | Yield (percent) | Purity (percent) | M.I.C. (mcg./ml.) |
|---|---|---|---|
| 6-(L-α-TSEC-amino-Σ-acetamidocaproamido)penicillanic acid | 8 | 56 | 2.5 |
| α-TSEC-amino-γ-methylsulphoxy-propylpenicillin | 28 | 58 | 6.25 |
| α-TSEC-amino-m-nitrobenzylpenicillin | 26 | 76 | 0.25 |
| α,m-di-(TSEC-amino)-benzylpenicillin | 60 | 64 | 0.63 |
| α-(2-thienyl)-β-(TSEC-amino)-ethylpenicillin | 34 | 82 | 0.13 |
| α-(3-thienyl)-β-(TSEC-amino)-ethylpenicillin | 30 | 77 | 0.25 |
| γ-TSEC-amino-propylpenicillin | 8 | 35 | 0.25 |

The corresponding N-2-p-tolylsulphonylethoxycarbonylamino acids were prepared by treatment of the amino acids in aqueous solutions at pH 9 with 2-p-tolylsulphonylethoxycarbonyl chloride as described in Example 3. Alternatively they were prepared via their esters as described in Example 2. In one case a cyclohexylamine salt of the acid was prepared for analysis. The following physical data were recorded.

| N-2-p-tolylsulphonylethoxycarbonyl compound of | | M.P. (° C.) | | Elemental analysis (percent) | | | |
|---|---|---|---|---|---|---|---|
| | | | | C | H | N | S |
| 2-N-acetyl-L-lysine | $C_{18}H_{26}N_2O_7S$ | 139–140 | Found | 52.78 | 6.32 | 6.76 | 7.74 |
| | | | Calc. | 52.16 | | | |
| Methionine sulphoxide | $C_{15}H_{21}NO_7S_2$ | 137–138 | Found | 46.32 | 5.45 | 3.55 | 16.55 |
| | | | Calc. | 46.02 | 5.41 | 3.58 | 16.38 |
| α-amino-m-nitrophenyl-acetic acid.[1] | $C_{24}H_{31}N_3O_8S$ | 167 | Found | 56.91 | 6.25 | 8.12 | 6.48 |
| | | | Calc. | 55.26 | 5.99 | 8.06 | 6.15 |
| β-amino-α-(2-thienyl)-propionic acid. | $C_{17}H_{19}NO_6S_2$ | 121–122 | Found | | | | 15.7 |
| | | | Calc. | | | | 16.1 |
| β-amino-α-(3-thienyl)-propionic acid. | $C_{17}H_9NO_6S_2$ | 151–152 | Found | 50.9 | 4.77 | 3.62 | 16.0 |
| | | | Calc. | 51.4 | 4.82 | 3.52 | 16.1 |
| γ-Aminobutyric acid | $C_{14}H_{19}NO_6S$ | 103–110 | Found | 51.03 | 5.94 | 4.15 | 9.96 |
| | | | Calc. | 51.05 | 5.81 | 4.25 | 9.74 |

[1] Cyclohexylamine salt.

*Example 7.—Preparation of 6-[γ-(2-p-tolylsulphonylethoxycarbonylamino)-butyramido]-penicillanic acid*

γ-(2-p-tolylsulphonylethoxycarbonylamino)butyric acid (5.1 g., 0.016 mole) and triethylamine (1.6 g., 0.016 mole) in 100 ml. of dry dimethylformamide were stirred at −10° C. and treated dropwise with ethyl chloroformate (1.7 g., 0.016 mole). 10 min. after that the addition of the latter was complete, an ice-cooled solution of 6-aminopenicillanic acid (5.1 g., 0.023 mole) and triethylamine (2.5 g., 0.025 mole) in 60 ml. of water was rapidly added and stirring was continued for 90 min. without external cooling. Water was added and the reaction mixture was washed with ether, acidified to pH 2 and extracted twice with ether. The combined ether extracts were washed with water and extracted with N potassium bicarbonate till the aqueous phase was neutral. Freeze-drying of the latter gave 0.7 g. of the potassium salt of 6 - [γ - (2-p-tolylsulphonylethoxycarbonylamino)-penicillanic acid with a purity of 35% (hydroxylamine assay with the potassium salt of benzylpenicillin as standard).

This product was found to inhibit the growth of *Staph. aureus* Oxford at a concentration of 0.25 mcg./ml.

γ - (2 - p - tolylsulphonylethoxycarbonylamino)butyric acid, M.P. 106–109° C., was obtained by treatment of γ-aminobutyric acid at pH 9 in 50% dioxane with 2-p-tolylsulphonylethoxycarbonyl chloride. It was isolated by extraction with ether after acidification of the reaction mixture.

In the manner, described in Examples 2 and 3, the following N-2-p-tolylsulphonylethoxycarbonylaminopenicillins were prepared. In the table are given yields and purities (hydroxylamine assay) of the products together with their activities against *Staph. auerus* Oxford (M.I.C.=

*Example 8.—Preparation of α-(2-phenylsulphonylethoxycarbonylamino)-γ-methylthiopropylpenicillin*

N - 2 - phenylsulphonylethoxycarbonylmethionine (7 g., 0.02 mole) was dissolved in dry dimethylformamide (150 ml.), containing triethylamine (2 g., 0.02 mole). Ethyl chloroformate (2.2 g., 0.02 mole) was added dropwise with stirring at −10° C. 10 min. after that all of the chloroformate had been added a chilled solution of 6-aminopenicillanic acid (6.5 g., 0.03 mole) and triethylamine (3.2 g., 0.032 mole) in water (35 ml.) was rapidly added and stirring was continued for 20 min. without external cooling. Water was added and the reaction mixture was washed with ether, acidified to pH 2 and extracted twice with ether. The combined ether extracts were washed with water and extracted with N potassium bicarbonate solution till the aqueous phase was neutral. Freeze-drying of it gave 1.4 g. of penicillin with a purity of 77% (hydroxylamine assay with benzylpenicillin as standard).

The N - 2 - phenylsulphonylethoxycarbonylmethionine was obtained by treatment of methionine in aqueous solution at pH 9 with 2-phenyl-sulphonylethoxycarbonyl chloride. The product was isolated by extraction with ether at pH 2. For analysis the cyclohexylamine salt was prepared, M.P. 120–26° C. (Found: C, 52.33; H, 7.11; N, 5.88; S, 13.81. Calc. for $C_{20}H_{32}N_2O_6S_3$: C, 52.15; H, 7.00; N, 6.08; S, 13.92%).

*Example 9.—Preparation of α-(2-p-chlorophenylsulphonylethoxycarbonylamino)-γ-methylthiopropylpenicillin*

N - 2 - p - chlorophenylsulphonylethoxycarbonyl-methionine (5.9 g., 0.015 mole) and triethylamine (1.5 g., 0.015 mole) in dry dimethylformamide (75 ml.) were stirred at −10° C.—−15° C., while ethyl chloroformate (1.6 g., 0.015 mole) dissolved in a few ml. of ether, was added dropwise. 10 min. after that all of the chloroformate had been added an ice-cold solution of 6-aminopenicillanic acid (4.2 g., 0.023 mole) and triethylamine (2.4 g., 0.024 mole) in water (65 ml.) was rapidly added and stirring was continued for 90 min. without external cooling. Water was added and the mixture was washed with ether, acidified to pH 1.5 and extracted with ether. The combined ether extracts were washed with water and extracted with N potassium bicarbonate till the aqueous phase was neutral. Freeze-drying of the latter gave 7.5 g. of the potassium salt α-(2-chlorophenylsulphonylethoxycarbonylamino)-γ-methylthiopropylpenicillin with a purity of 77% (hydroxylamine assay with benzylpenicillin as standard).

The product was found to inhibit the growth of *Staph. aureus* Oxford at a concentration of 0.25 mcg./ml.

The N - 2 - p - chlorophenylsulphonylethoxycarbonylmethionine, M.P. 95–97° C. (Found: C, 42.71; H, 4.56; Cl, 8.96; N, 3.53; S, 16.02. Calc. for $C_{14}H_{18}ClNO_6S_2$: C, 42.47; H, 4.58; Cl, 8.96; N, 3.54; S, 16.20%) was prepared by treatment of methionine in aqueous solution at pH 9 with 2-p-chlorophenylsulphonylethoxycarbonyl chloride. The product was isolated by extraction at pH 2 and recrystallized from ethyl acetate.

In the way, described in Example 9 the α-(2-p-chlorophenylsulphonylethoxycarbonylamino) - γ-methylsulphonyl-propylpenicillin was prepared.

*Example 10.*—Preparation of 6[D-α-(2-p-tolylsulphonyl-ethoxycarbonylamino)-phenylacetamido]penicillanic acid 6-(D-α-amino-phenylacetamido)penicillanic acid (85% pure, 41 g., 0.1 mole) suspended in a mixture of water (250 ml.) and methylisobutylketone (250 ml.) was treated at pH 8.5 with 2-p-tolylsulphonylethoxycarbonyl chloride (97% pure, 27.2 g., 0.1 mole), dissolved in dry ether (100 ml.), while stirring and cooling in an ice-bath. The pH of the reaction mixture was kept constant by addition of 2 N sodium hydroxide. After the consumption of base had ceased, the reaction mixture was washed with ether and butylacetate, acidified to pH 1.5 and extracted several times with butylacetate. The combined butylacetate extracts were washed with water, dried over anhydrous magnesium sulphate for 45 min. and filtered. Isopropylamine (5.9 g., 0.1 mole) was added and a crystalline precipitate of the isopropylamine salt of 6-[D-2-(2-p-tolylsulphonyl-ethoxycarbonylamino)-phenylacetamido]-penicillanic acid was formed on cooling. After standing three days in the ice-box, it was filtered, washed and dried. There was obtained 60.8 g. of the penicillin with a purity of 94% (hydroxylamine assay with benzylpenicillin as standard).

*Example 11.*—Preparation of 6-[D-α-(2-p-chlorophenyl-sulphonyloxycarbonylamino) - phenylacetamido]penicillanic acid 6 - (D - α - amino - phenylacetamido)penicillanic acid (85% pure, 20.7 g., 0.05 mole) in a stirred and cooled mixture of water (150 ml.) and methylisobutylketone (150 ml.) was treated at pH 8.5 with 2-p-chlorophenyl-sulphonylethoxycarbonyl chloride (14.2 g., 0.05 mole), dissolved in dry ether. After the reaction was complete, the mixture was washed with ether, acidified to pH 1.5 and extracted with ether repeatedly. The combined ether extracts were washed with water and extracted with N potassium bicarbonate solution (150 ml.). The pH of the aqueous phase was adjusted to 6.5 and the solution was freeze-dried to give 28.1 g. of the potassium salt of 6-[D - α - (2 - p-chlorophenylsulphonylethoxycarbonylamino)-phenylacetamido]penicillanic acid with a purity of 74% (hydroxylamine assay with benzylpenicillin as standard). Paper chromatography showed that the product contained minor amounts of 6-(D-α-amino-phenylacetamido)penicillanic acid and of a further compound with antibiotic properties as by-products.

*Example 12.*—Preparation of 6-[D-α-(2-p-nitrophenyl-sulphonylethoxy - carbonyl - amino)-phenylacetamido] penicillanic acid A stirred and cooled mixture of 6-(D-α-aminophenyl-acetamido)-penicillanic acid (84%, 9.7 g., 0.023 mole), methylisobutylketone (70 ml.) and water (70 ml.) was treated with 2 - p - nitrophenylsulphonylethoxycarbonyl chloride (6.9 g., 0.023 mole), while the pH of the reaction mixture was kept constant at 8.5 by addition of 2 N sodium hydroxide. After the consumption of base had ceased the reaction mixture was washed with ethyl acetate, acidified to pH 1.5 and extracted with ethylacetate. The combined ethylacetate extracts were washed with water and extracted with N potassium bicarbonate till the aqueous phase was neutral. After washing with ether the aqueous phase was adjusted to pH 6.5 and pure-dried to give 5.8 g. of the potassium salt of 6-[-α-(2-p-nitrophenylsulphonylethoxycarbonylamino) - phenylacetamido]penicillanic acid and with a purity of 64% (hydroxylamine assay with benzylpenicillin as standard).

We claim:
1. Penicillins having the formula:

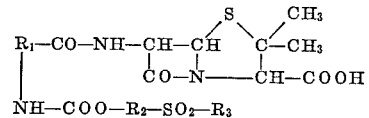

and non-toxic salts thereof; wherein $R_1$ is selected from the group consisting of unsubstituted and substituted lower alkyl radicals, with the substituted lower alkyl radicals having substituent radicals selected from the group consisting of lower alkyl, lower alkanoyloxy, monocarbocyclic aryl containing from 6 to 10 carbon atoms, carbethoxy, lower alkanoyloxyamino and lower monocarbocyclic aryloxyamino, lower alkyl sulfoxy, lower alkyl sulfonyl, lower alkyl thio and sulfur and oxygen-substituted monohetercyclic radicals containing a maximum of 10 carbon atoms, and monocarbocyclic aryloxy radicals containing from 6 to 10 carbon atoms; $R_2$ is ethylene; $R_3$ is selected from the group consisting of unsubstituted and substituted monocarbocyclic aryl radicals containing from 6 to 10 carbon atoms, with the substituted radicals having substituent radicals selected from the group consisting of halide, lower alkyl, lower alkoxy, and nitro radicals.

2. Penicillins having the formula:

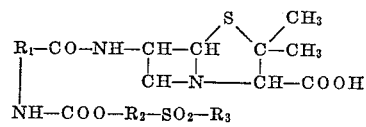

and non-toxic salts thereof; wherein $R_1$ is selected from the group consisting of unsubstituted and substituted benzyl radicals, with the substituted lower alkyl radicals having substituent radicals selected from the group consisting of halide, lower alkyl, lower alkylamino, nitro, lower alkoxy, monocarbocyclic aryloxy containing from 6 to 10 carbon atoms; monocarbocyclic aryl radicals containing from 6 to 10 carbon atoms and monocarbocyclic aryloxy radicals containing from 6 to 10 carbon atoms; $R_2$ is ethylene; $R_3$ is selected from the group consisting of unsubstituted and substituted monocarbocyclic aryl radicals containing from 6 to 10 carbon atoms, with the substituted radicals having substituent radicals selected from the group consisting of halide, lower alkyl, lower alkoxy, and nitro radicals.

3. Compounds as set forth in claim 2, in which $R_1$ is an unsubstituted benzyl radical.

4. Compounds as set forth in claim 1, wherein $R_1$ is an α-thienylethyl radical with the thienyl group in a position selected from the group consisting of positions two and three.

5. Compounds as set forth in claim 1, wherein $R_3$ is p-tolyl.

6. Compounds as set forth in claim 1, wherein $R_3$ is phenyl.

7. A compound as set forth in claim 1, which is N-2-p-tolylsulfonylethoxycarbonylaminomethyl penicillin.

8. A compound as set forth in claim 1, which is α-(2-p-tolylsulfonylethoxycarbonylamino)heptyl penicillin.

9. A compound as set forth in claim 1, which is 6-[D-α-(2-p-tolylsulfonylethoxycarbonylamino)-phenylacetamido] penicillanic acid.

10. A compound as set forth in claim 1, which is 6-[α-(2-p-tolylsulfonylethoxycarbonylamino)-β-methyl-β-(p-methoxyphenyl)butyramido] penicillanic acid.

11. A compound as set forth in claim 1, which is 6-[β-(2-p-tolylsulfonylethoxycarbonylamino)-α-phenylpropionamido] penicillanic acid.

12. Compounds as set forth in claim 2, wherein $R_3$ is p-tolyl.

13. Compounds as set forth in claim 2, wherein $R_3$ is phenyl.

References Cited
UNITED STATES PATENTS 3,245,983  4/1966  Doyle et al. ———— 260—239

NICHOLAS S. RIZZO, *Primary Examiner.*

UNITED STATES PATENT OFFICE
CERTIFICATE OF CORRECTION

Patent No. 3,373,156                  March 12, 1968

Peter Bamberg et al.

It is hereby certified that error appears in the above numbered patent requiring correction and that the said Letters Patent should read as corrected below.

Column 2, lines 4 and 5, "methylsulpoxypropylpenicillin" should read -- methylsulphoxypropylpenicillin --. Column 3, line 37, "N-trialkylsilylaminopenicillanic" should read -- N-trialkylsilylaminopenicillanic --; lines 59 and 60, "N-2-p-tolylsulphenylethoxycarbonylaminomethylpenicillin" should read -- N-2-p-tolylsulphonylethoxycarbonylaminomethylpenicillin --; lines 63 and 64, N-2-p-tolylsulphenylethoxycarbonylglycyl" should read -- N-2-p-tolylsulphonylethoxycarbonylglycyl --. Column 4, lines 3 and 29, "mcq", each occurrence, should read -- mcg --; line 4, "N-2-p-tolylsulphenylethoxycarbonylglycy" should read -- N-2-p-tolylsulphonylethoxycarbonylglycyl --; line 7, "α-(2-p-tolylsulphenylethoxy-" should read -- α-(2-p-tolylsulphonylethoxy- --; line 32, "2-p-tolylsulphenylethyl" should read -- 2-p-tolylsulphonylethyl --; lines 35 and 36, "α-(2-p-tolylsulphenylethoxycarbonylamino)" should read -- α-(2-p-tolylsulphonylethoxycarbonylamino) --. Column 5, line 44, "$C_{22}N_{36}N_2O_6S$" should read -- $C_{22}H_{36}N_2O_6S$ --. Column 6, line 28, "witd" should read -- with --; line 73, "0.0022" should read -- 0.022 --. Column 7, line 60, after "(2-p-tolylsulphonylethoxycarbonylamino)-" insert -- butyramido] --. Column 10, line 36, "alkanoyloxyamino" should read -- alkanoylamino --; line 37, "aryloxyamino" should read -- aroylamino --; line 57, "lower alkyl" should read -- benzyl --.

Signed and sealed this 12th day of August 1969.

(SEAL)
Attest:

EDWARD M. FLETCHER, JR.             WILLIAM E. SCHUYLER, JR.
Attesting Officer                      Commissioner of Patents